United States Patent Office 3,359,226
Patented Dec. 19, 1967

3,359,226
METHOD FOR PRODUCTION OF A MOLDABLE PHOTOCHROMIC COMPOSITION
Sydney Arthur Giddings, New Canaan, and Lawrence Joseph Patella, Huntington, Conn., assignors to American Cyanamid Company, Stamford, Conn., a corporation of Maine
No Drawing. Filed Sept. 24, 1964, Ser. No. 399,087
9 Claims. (Cl. 260—30.4)

ABSTRACT OF THE DISCLOSURE

A method for the production of moldable photochromic compositions of matter which comprises blending an oxygen-containing polymer and a certain group of metal compounds, precipitating the resultant blend into a non-solvent and recovering the resultant precipitated composition is disclosed.

This invention relates to a process for the production of various moldable compositions of matter. More particularly, this invention relates to a process for the production of various moldable compositions of matter composed of a polymeric material and a transition metal compound. Still more particularly, this invention relates to a process for the production of various moldable photochromic compositions of matter composed of a polymeric material, a solvent therefor and a transition metal compound having the formula (I) $\qquad MX_mO_n(OR)_p$ wherein M is a transition metal, X is a halide, R is an alkyl radical having from 1–12 carbon atoms, inclusive, an aryl radical having from 6–10 carbon atoms, inclusive, or an

radical, $R^1$ is an alkyl radical having from 1–12 carbon atoms, inclusive, or an aryl radical having from 6–10 carbon atoms, inclusive, $m$ and $p$ are whole, positive integers of from 0–6, inclusive, and $n$ is a whole, positive integer of from 0–2, inclusive, the total of $2n+m+p$ being equal to the valence of the metal M, at least one of $m$ and $p$ being an integer of at least 1, and at least one of said polymer and said solvent contain oxygen which comprises intimately blending the polymer, solvent and transition metal compound to form a homogeneous mixture, contacting said homogeneous mixture with a liquid which is a non-solvent, i.e., precipitating agent, for the polymer and transition metal compound to precipitate a composition composed of said polymer and transition metal compound and recovering the resultant precipitated moldable, photochromic composition.

We have discovered that certain resinous materials can be blended with certain transition metal compounds to produce homogeneous mixtures which, when contacted with a non-solvent and precipitated, unexpectedly result in the production of moldable compositions of matter which change color when subjected to ultraviolet light and revert to their original color when subjected to near infrared light or a thermal treatment.

The use of photochromic materials as active ingredients in such applications as data storage devices, absorbers for incident, high-intensity radiation, photochemical printing, variable transmission devices and the like is well known in the art. There has been, however, to our knowledge, no disclosure of the production of moldable photochromic compositions of matter which can be colored by subjection to ultraviolet light and bleached by near infrared light. Furthermore, the prior art is silent in regard to moldable photochromic compositions of matter which absorb in the near infrared to result in articles which have the property of photochromism with changes in transmission in the visible regions coupled with heat absorption in the near infrared.

It is therefore an object of the present invention to provide a novel method for the production of various moldable compositions of matter.

It is a further object of the present invention to provide a novel process for the production of various moldable photochromic compositions of matter composed of a plastic and a transition metal compound.

It is a further object of the present invention to provide a process for the production of various moldable photochromic compositions of matter which are composed of a polymeric plastic material, a solvent therefor and a transition metal compound represented by Formula I, at least one of said polymer and said solvent containing oxygen, which comprises intimately blending the polymer, solvent and transition metal compound to form a homogeneous mixture, contacting said homogeneous mixture with a liquid which is a non-solvent for the polymer and transition metal compound to precipitate a polymer-transition metal compound moldable photochromic composition and recovering said moldable photochromic composition.

These and other objects of the present invention will become more apparent to those skilled in the art upon reading the more detailed description set forth hereinbelow.

PHOTOCHROMISM

Molecules or complexes which undergo reversible photo-induced color changes are termed photochromic systems. That is to say, in the absence of activating radiation, the system has a single stable electronic configuration with a characteristic absorption spectrum. When the system is contacted with ultraviolet irradiation the absorption spectrum for the system changes drastically, but when the irradiation source is removed, the system reverts to its original state.

Photochromism has been observed in inorganic and organic compounds both in solution and solid state. Although the exact mechanism of color change varies markedly in each individual system, there are two processes which account for most types of photochromic phenomena. The first process is the transformation of excited state electronic energy into vibrational and torsional twisting modes of the molecule. Usually, systems observed to be photochromic have very efficient routes for internal transformation of absorbed energy and are generally never fluorescent or phosphorescent. Internal transformation often takes place very rapidly, that is to say, the primary process in the photoproduction of a colored species often occurs in about a millimicrosecond. However, optical observation of the colored species normally takes considerably longer than this because of the very small amounts of colored material produced per unit time and the depletion of the color by the competing reverse reaction.

The second fundamental photo-electronic mechanism generally considered as producing photochromism is charge transfer. Most charge transfer phenomena in organic molecules are rapidly reversible and therefore produce no colored intermediate. However, in inorganic crystals, charge transfer absorption usually leads to a colored state in which the donor-acceptor crystals have been oxidized and reduced.

There are three major factors which govern the behavior of a photochromic system.

A. ABSORPTION OF INCIDENT RADIATION

According to the quantum theory, each absorbed quantum creates one activated molecule and only absorbed radiation can produce a chemical change. Variables which control the number of photons absorbed include the concentration and extinction coefficient of the photochrome, the cell length, the screening coefficients of other components of the system, and the wavelengths of the incident radiation.

B. QUANTUM YIELD

All excited molecules will not undergo transformation to the colored form, so that the quantum yields will generally be less than unity. Various deactivating processes which compete for the excited molecules include fluorescence, phosphorescence, permanent chemical change and the thermal release.

C. THE REVERSE REACTION

In both the forward and reverse reactions, the concentration of the colored form is dependent on the intensity of the radiation, the kinetics of the reverse reactions, and temperature and solvent sensitivity of the reactions. The kinetics for the reverse reaction will normally be controlling, however some reverse reactions are thermally sensitive and are accelerated by irradiation.

The terms "photochromic substance," "photochromic compositions" or "photochromic material," and the like, as used in the instant disclosure, mean substances, compositions or materials, etc., which change their transmission or reflectance upon being subjected to ultraviolet or visible irradiation and subsequently revert to their original state upon subjection thereof to a different wavelength of radiation or removal of the initial ultraviolet source.

The ability of various materials to change color and to then revert back to their original color is not a new phenomena. In fact, such compounds have been widely used in various ways, as described above. Generally these compounds change their color when exposed to ordinary sunlight and revert back to their original color upon removal thereof from the rays of the sun. Various other materials, however, change color only when subjected to a certain degree of irradiation, and as such, sunlight will not effect them. High intensity radiation, such as 10–25 cal./cm.²/sec. or more, is necessary in regard to these compounds, while sunlight (0.2 cal./cm.²/sec.) will affect the former.

As mentioned above, we have found that moldable photochromic compositions of matter can be produced according to our novel process by blending a soluble or fusible polymeric material and a transition metal compound represented by Formula I, above, to produce a homogeneous mixture. The mixture is then contacted with a non-solvent for the polymer and metal compound to cause the precipitation of the moldable, photochromic composition. In a preferred modification, we have found that a solvent for the polymer may also be present during the blending of the polymer and metal compound. The only critical requirement in regard to the blending of these components is that at least one of the polymer or the solvent, if present, must contain oxygen, either in combined or free form. That is to say, no photochromic phenomena is observable in the compositions which are recovered after precipitation according to our novel process, unless the solvent, the polymeric material, or both, contain oxygen in some form, such as combined with the other elements of the component in question or in free form, i.e., as an added entity, e.g., an impurity and the like. Of course, when no solvent is employed in our novel process, the polymeric component must contain oxygen before any photochromic phenomena can be observed in the resultant compositions. Evidence of the criticality of the presence of oxygen can be seen from the various examples set forth hereinbelow.

Any soluble or fusible thermoplastic resin can be used in our novel process. That is to say, any polymeric material, synthetic or naturally occurring, which is thermoplastic in nature and which may be dissolved in a solvent or be made molten, may be used herein. Examples of thermoplastic resinous or plastic materials which may be utilized in the process of the present invention are the polymers of the various esters of acrylic acid and methacrylic acid, e.g., those having the formula (II) 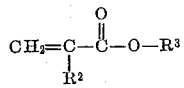

wherein $R^2$ is hydrogen or a methyl radical and $R^3$ is an alkyl radical having from 1 to 6 carbon atoms, inclusive. Compounds which are represented by Formula II and consequently may be used as monomers from which the polymers used in the present invention may be produced include methyl acrylate, ethyl acrylate, n-propyl acrylate, isopropyl acrylate, n-butyl acrylate, isobutyl acrylate, t-butyl acrylate, n-amyl acrylate, isoamyl acrylate, t-amyl acrylate, hexyl acrylate, methyl methacrylate, ethyl methacrylate, n-propyl methacrylate, isopropyl methacrylate, n-butyl methacrylate, isobutyl methacrylate, t-butyl methacrylate, n-amyl methacrylate, isoamyl methacrylate, t-amyl methacrylate, hexyl methacrylate and the like.

Other polymers which may be employed in our novel process are those produced from styrene monomers, e.g., those having the formula (III) 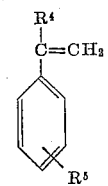

wherein $R^4$ is hydrogen or a lower alkly radical having 1 to 4 carbon atoms, inclusive, and $R^5$ is hydrogen, a lower alkyl radical having 1 to 4 carbon atoms, inclusive or a halogen radical. Suitable monomers represented by Formula III include styrene, methyl styrene, ethyl styrene, propyl styrene, o-, m-, or p-butyl styrene, o-, m-, or p-chlorostyrene, o-, m-, or p-bromostyrene, o-, m-, or p-fluorostyrene, o-, m-, or p-iodostyrene, α-methyl styrene, α-ethylstyrene, α-butyl styrene, α-methyl-o-, m- or p-methylstyrene, α-methyl-o-, m- or p-ethylstyrene, α-butyl-o-, m- or p-ethylstyrene, α-ethyl-o-, m- or p-chlorostyrene, α-propyl-o-, m- or p-iodostyrene and the like.

Further examples of polymers which may be utilized in the novel process of the present invention include polymers of acrylonitrile, polymers of acrylamide, polymers of vinyl halides such as poly(vinyl chloride); polymers of vinylidene halides such as poly(vinylidene chloride); polymers of vinyl carbonate, and polymers of vinyl alcohol, vinyl acetate, and vinyl butyral; various polymers of aldehydes, such as formaldehyde, acetaldehyde, crotonaldehyde, etc., polymers of ethylene oxide, cellulose polymers such as cellulose acetate butyrate, cellulose triacetate, and any other polymeric material, with which the transition metal compound is compatible which may be used in the molten state or dissolved in an appropriate solvent.

Additionally, the monomers represented by Formulae II and III above, and additionally, those which are disclosed hereinabove as useful for producing homopolymers, can be copolymerized either singly or in a plurality (two, three, four or any desired number), the latter often being desirable in order to improve the compatability and copolymerization characteristics of the mixture of monomers with themselves or various other monomers with which they are copolymerizable to obtain copolymers having particular properties desired for particular service applications. Examples of such applicable comonomers are the unsaturated alcohol esters, more particularly the allyl, methallyl, 1-chloroallyl, 2-chloroallyl, cinnamyl, vinyl, methvinyl, 1-phenylallyl, etc., esters of saturated aliphatic and aromatic monobasic and polybasic acids such, for instance, as acetic, propionic, butyric, valeric, caproic, oxalic, malonic, succinic, glutaric, adipic, pimelic, suberic, azelaic, sebacic, benzoic, phenylacetic, phthalic, terephthalic, benzoylphthalic, etc., acids; vinyl naphthalene, vinyl cyclohexane, vinyl furane, vinyl pyridine, vinyl dibenzofuran, divinyl benzene, trivinyl benzene, allyl benzene, diallyl benzene, N-vinyl carbazole, unsaturated ethers, e.g., ethyl vinyl ether, diallyl ether, ethyl methallyl ether, etc.; unsaturated amides, for instance, N-allyl caprolactam, N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc.

Further examples of thermoplastic polymers useful in our novel process are thermoplastic polyesters such as those produced by reacting a saturated aliphatic diol with a non-polymerizable polycarboxylic acid to produce a polyester having an acid number not appreciably more than 75. Among the dihydric alcohols which may be employed are saturated aliphatic diols such as ethylene glycol, propylene glycol, butylene glycol, diethylene glycol, dipropylene glycol, triethylene glycol, tetraethylene glycol, butanediol-1,2, butanediol-1,3, butanediol-1,4, pentanediol-1,2, pentanediol-1,3, pentanediol-1,4, pentanediol-1,5, hexanediol-1,2, hexanediol-1,3, hexanediol-1,4, hexanediol-1,5, hexanediol-1,6, neopentyl glycol, and the like, as well as mixtures thereof. Among the polyols having more than two hydroxyl groups which may be employed in minor amounts, together with the above-mentioned diols, are saturated aliphatic polyols such as glycerol, trimethylol ethane, trimethylol propane, pentaerythritol, dipentaerythritol, arabitol, xylitol, dulcitol, adonitol, sorbitol, mannitol, and the like, as well as mixtures thereof.

Non-polymerizable polycarboxylic acids, i.e., acids which are saturated or which contain only benzenoid unsaturation, which may be used include oxalic, malonic, succinic, glutaric, adipic, pimelic, suberic, azelaic, sebacic, malic tartaric, tricarballylic, citric, phthalic, isophthalic, terephthalic, cyclohexanedicarboxylic, endomethylenetetrahydrophthalic, and the like, as well as mixtures thereof.

The esterification mixtures, from which the thermoplastic polyester resins employed in the practice of the present invention are prepared, are generally formulated so as to contain at least a stoichiometric balance between carbonyl and hydroxyl groups. Thus, where a diol and a dicarboxylic acid are employed, they are usually reacted at elevated temperatures and in an inert atmosphere, on at least a mole to mole basis. In common commercial practice, a small excess of polyol, usually in the range of from about 5% to about 15% excess, is employed. This is done primarily for economic reasons, i.e., to insure a rapid rate of esterification.

Further details pertaining to the preparation of polyester resins of the types employed in the practice of the present invention are disclosed in U.S. Patent No. 2,255,-313 to Ellis and in U.S. Patent Nos. 2,443,735 to 2,443,-741, inclusive, to Kropa, and these patents are hereby incorporated into the present application by reference.

Further examples of polymeric materials which may be used in the novel process of the present invention are the polyamide resins, i.e., those produced from a dibasic acid and a polyamine. Polyamide resins of this type are well known in the art and are generally termed "nylon" resins. These nylon resins, as used in the instant specification, are long chain synthetic polymeric amides which have recurring amide groups as an integral part of the main polymer chain and which are capable of being formed into a filament in which the structural elements are oriented in the direction of the axes. Most common of these nylons or polyamides are obtained by condensation of a diamine with a dicarboxylic acid or by auto-condensation of an amino acid. These polyamides have the structural formula (IV)

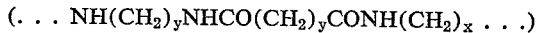

$x$ and $y$ being greater than one. Methods for the production of polyamides of this type are shown, for example, in the following patents: U.S. Patent Nos. 2,191,556; 2,293,760; 2,293,761; 2,327,116; 2,359,877; 2,377,895; 2,572,843, said patents hereby being incorporated herein by reference.

Additionally, we may utilize such polymeric materials as the polyurethanes, i.e., any polyester based or polyether based polyurethane resin. Among the reactive organic polyfunctional polyols employed in preparing one class of polyurethane resins used in the practice of our invention, by reaction with a suitable isocyanate compound, are the polyalkylene ether, thioether, and ether-thioether glycols represented by the general formula (V)          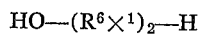

wherein $R^6$ represents the same or different alkylene radicals containing up to about 10 carbon atoms, $X^1$ represents oxygen of sulfur, and $z$ is an integer large enough so that the molecular weight of the polyalkylene ether, thioether, or ether-thioether glycol is at least about 500, e.g., from about 500 to about 10,000. The polyalkylene ether glycols included within this genral formula, such as polyethylene glycols, polypropylene glycols, polybutylene glycols, polytetramethylene glycols, polyhexamethylene glycols, and the like, which are obtained, for example, by acid-catalyzed condensation of the corresponding monomeric glycols or by the condensation of lower alkylene oxides, such as ethylene oxide, propylene oxide, and the like, either with themselves or with glycols such as ethylene glycol, propylene glycol, and the like, are preferred.

Polyalkylenearylene ether, thioether and ether-thioether glycols which also have molecular weights ranging from about 500 to about 10,000 but which differ from the above-described polyalkylene glycols in having arylene radicals, such as phenylene, naphthylene, and anthrylene radicals, either unsubstituted or substitued, e.g., with alkyl or aryl groups, and the like, in place of some of the alkylene radicals of said polyalkylene glycols may also be employed. Polyalkylenearylene glycols of the type ordinarily used for this purpose will usually contain at least one alkylene ether radical having a molecular weight of about 500 for each arylene radical present.

Essentially linear polyesters containing a plurality of isocyanate-reactive hydroxyl groups constitute another class of reactive organic polyfunctional polyols which may be employed in preparing polyurethane resins useful in the practice of the present invention. While the preparation of polyesters suitable for this purpose has been described in great detail in the prior art and forms no part of the present invention per se, it may be mentioned here by way of illustration that polyesters of this type may be prepared by the condensation of a polyhydric alcohol, with a polycarboxylic acid or anhydride in the same manner as set forth hereinabove in regard to the dissertation on applicable polyester resins which may be used herein, with the same examples of reactants applying in both instances.

The essentially linear polyesters commonly used in preparing polyurethane resins preferably have molecular weights ranging from about 750 to about 3,000. In addition, they will generally have relatively low acid numbers, e.g., acid numbers not appreciably in excess of about 60 and preferably as low as can be practicably obtained, e.g., 2 or less. Correspondingly, they will generally have relatively high hydroxyl numbers, e.g., from about 30 to about 700. When preparing these polyesters, an excess of polyol over polycarboxylic acid is generally used to insure that the resulting essentially linear polyester chains contain a sufficient amount of reactive hydroxyl groups.

The polyurethane resins useful in our novel process may be prepared using a wide variety of organic polyisocyanates, among which there are included aromatic diisocyanates, such as m-phenylenediisocyanate, p-phenylenediisocyanate, 4-t-butyl - m - phenylenediisocyanate, 4-methoxy - m - phenylenediisocyanate, 4 - phenoxy - m - phenylenediisocyanate, 4 - chloro - m - phenylenediisocyanate, toluenediisocyanates (either as a mixture of isomers, e.g., the commercially available mixture of 80% 2,4-toluenediisocyanate and 20% 2,6 toluenediisocyanate, or as the individual isomers themselves), m - xylylenediisocyanate, p - xylylenediisocyanate, cumene - 2,4 diisocyanate, durenediisocyanate, 1,4 - naphthylenediisocyanate, 1,5-naphthylenediisocyanate, 1,8 - naphthylenediisocyanate, 2,6-naphthylenediisocyanate, 1,5 - tetrahydronaphthylenediisocyanate, p,p' - diphenyldiisocyanate, diphenylmethane-4,4' - diisocyanate, 2,4 - diphenylhexane - 1,6 - diisocyanate, "bitolylenediisocyanate" (3,3' - dimethyl - 4,4' biphenylenediisocyanate), "dianisidinediisocyanate" (3,3'-dimethoxy - 4,4' - biphenylenediisocyanate), and polymethylenepolyisocyanates represented by the general formula (VI) 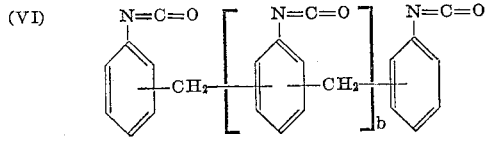

wherein $b$ represents an integer between 0 and about 5, and the like; aliphatic diisocyanates, such as methylenediisocyanate, ethylenediisocyanate, the tri-, tetra-, penta-, hexa-, hepta-, octa-, nona- and decamethylene-$\omega,\omega'$-diisocyanates, 2 - chlorotrimethylenediisocyanate, 2,3 - dimethyltetramethylenediisocyanate, and the like, and tri- and higher isocyanates, such as benzene-1,3,5-triisocyanate, toluene-2,4,6-triisocyanate, diphenyl-2,4,4'triisocyanate, triphenylmethane-4,4', 4''-triisocyanate, and the like. Mixtures of two or more of such organic polyisocyanates may also be employed to prepare the applicable polyurethane resins by reaction with the ethers and esters described above utilizing procedures well known to those skilled in the art, see for example, U.S. Patents 2,729,618, 3,016,364 and the like.

As mentioned above, the polymer used in our novel process may be blended with the metal compound as a molten material or as a solution thereof in a suitable solvent. While the use of a solvent is preferred, it is not critical. The actual solvent employed in each instance is not critical except for the fact that it is preferred that the solvent contain an oxygen atom, as specified above. Generally, any compound which is a solvent for the polymer may be employed for this purpose in a sufficient amount so as to dissolve the polymer employed, provided that at least the polymer or the solvent contains oxygen, as mentioned above.

Examples of solvents which may be utilized include dimethyl formamide, acetonitrile, methylene chloride, glyme ($CH_3OCH_2CH_2OCH_3$), diglyme ($CH_3OCH_2CH_2OCH_2CH_2OCH_3$)

chloroform, ethyl acetate, methylene chloride, trioxane, dioxane, ethyl formate, ethylene dichloride, isopropyl acetate, methyl acetate, acetic acid, acetone, benzil, acetaldehyde, benzaldehyde, butyl acetate, Cellosolve, cyclohexanol acetate, cyclohexanone, methylethylketone, benzene, gamma-valerolactone, methanol, ethanol, hexanol, nitrobenzene, nitropropane, trichloroethylene, aniline, diacetone alcohol, ethyl lactate, carbon tetrachloride, pyridine, toluol, xylol, ethylene glycol, water and the like.

Additionally any specific polymer may be dissolved in one of its own constituents so as to form a solution thereof. That is to say, poly(methyl methacrylate), for example, can be utilized as a solution of the polymer in methyl methacrylate. Likewise, other polymers may also be used as solutions thereof in monomers of which they are composed.

Furthermore, mixtures of the above-mentioned solvents or other solvents which conform to the requirements set forth herein, may be used to solubilize the polymers. For example, methylene chloride and acetic acid in a 50/50 mixture may be used with poly(methyl methacrylate).

In many instances, the polymers, as a result of solvents used during the polymerization thereof, or the solvents, as a result of an affinity or weak bonding reaction, may contain a minor or trace amount of an impurity, such as water and the like. In instances of this sort, no newly added solvent need be added if the critical oxygen requirement mentioned above has been fulfilled by the impurity and not the solvent or polymer, per se. By the term "trace amounts" or "impurities" is meant those amounts as minimal as 0.1% are tolerable and generally sufficient to enable the production of a moldable photochromic composition.

Examples of transition metal compounds which may be utilized in the practice of the present invention and which are represented by Formula I include titanium tetrachloride, titanium oxide dichloride, zirconium tetrachloride, zirconium oxide dichloride, tungsten hexachloride, tungsten oxide tetrachloride, tungsten dioxide dichloride, hafnium tetrachloride, hafnium oxide dichloride, tantalum pentachloride, tantalum oxide trichloride, tantalum dioxide chloride, titanium tetrabromide, titanium oxide dibromide, zirconium tetrabromide, zirconium oxide dibromide, tungsten hexabromide, tungsten oxide tetrabromide, tungsten dioxide dibromide, hafnium tetrabromide, hafnium oxide dibromide, tantalum pentabromide, tantalum oxide tribromide, tantalum dioxide bromide, titanium tetraiodide, titanium oxide diiodide, zirconium tetraiodide, zirconium oxide diiodide, tungsten hexaiodide, tungsten oxide tetraiodide, tungsten dioxide diiodide, hafnium tetraiodide, hafnium oxide diiodide, tantalum pentaiodide, tantalum oxide triiodide, tantalum dioxide iodide, titanium tetrafluoride, titanium oxide difluoride, zirconium tetrafluoride, zirconium oxide difluoride, tungsten hexafluoride, tungsten oxide tetrafluoride, tungsten dioxide difluoride, hafnium tetrafluoride, hafnium oxide difluoride, tantalum pentafluoride, tantalum oxide trifluoride, tantalum dioxide fluoride, chromium dioxide dichloride, chromium dioxide dimethoxide, vanadium oxide trichloride, vanadium oxide triiodide, vanadium dioxide bromide, vanadium dioxide methoxide, titanium tetramethoxide, titanium tetraethoxide, titanium tetraheptoxide, titanium tetradodecoxide, titanium oxide dimethoxide, titanium dichloride dimethoxide, titanium trichloride ethoxide, titanium chloride trimethoxide, zirconium tetramethoxide, zirconium tetraphenoxide, zirconium tetra(p-tolyloxide), zirconium tetra(1-naphthoxide), zirconium oxide dimethoxide, zirconium oxide diphenoxide, zirconium dibromide diethoxide, zirconium trifluoride butoxide, zirconium iodide trimethoxide, hafnium tetraacetate, hafnium tetravalerate, hafnium tetralaurate, hafnium oxide diacetate, hafnium dibromide divalerate, hafnium trifluoride laurate, hafnium chloride triphenoxide, tantalum pentamethoxide, tantalum pentabenzoate, tantalum penta(p-toluate), tantalum penta(2-naphthoate), tantalum oxide tribenzoate, tantalum dioxide methoxide, tantalum dichloride triethoxide, tantalum tetrabromide acetate, tantalum bromide tetraphenoxide, tantalum trifluoride dimethoxide, tungsten hexamethoxide, tungsten oxide tetrabenzoate, tungsten dioxide diacetate, tungsten pentachloride methoxide, tungsten terabromide bis(p-toluate), tungsten triiodide tris(p-tolyloxide), tungsten dichloride tetravalerate, tungsten, bromide penta(1-naphthoate) and the like. The amount of transition metal blended with the polymeric material may range from 0.01% to 50.0%, by weight, based on the weight of the polymer, preferably 0.1% to 10.0%, by weight, same basis.

The transition metal compounds listed above are all well known in the art and may be produced by any equally well known procedure. Examples of applicable methods for the production thereof appear in at least one of the following articles. Razivaer et al., Tetrahedron 6, 159 (1959); Sandho et al., Current Sci. (Ind) 29, 222 (1960); Rosenheim, ch. Nernst. Z. Anorg. Chem. 214, 220 (1933); Bradley et al., J. Chem. Soc. (1953), 1634, and these references are hereby incorporated herein by reference.

The order of blending of the polymer, transition metal compound and solvent with one another is not critical and any order of blending may be used. For example, the solvent may be blended with the polymer and then the transition metal compound may be added, the metal and solvent may be blended and the resultant solution may then be added to the resin or the polymer, solvent and transition metal compound may be blended simultaneously. Of course, if the polymer is used in a molten state in the absence of any added solvent, the metal is merely added thereto as such and blended thoroughly. The components may be thoroughly blended to form a homogeneous admixture by utilizing such means as a Waring Blendor, a ball mill, a rubber mill, an extruder and the like.

The second step of our novel process comprises contacting the polymer-transition metal compound blend (or solution if a solvent is used) with a non-solvent for the polymer and transition metal compound to cause the precipitation thereof. The polymer and metal compound precipitate (with or without a small amount of occluded solvent) in the non-solvent bath as a highly dispersed solid. This material is then recovered by any suitable means such as filtration, decantation, centrifugation and the like, as a moldable composition and changes color when subjected to ultraviolet light and returns to its original color when removed from said light.

The particular non-solvent utilized in each instance is, of course, governed by the specific polymer and transition metal compound in the homogeneous blend. It is considered satisfactory in the practice of the present invention if the polymer and transition metal compound are merely swellable in the non-solvent, however, it is preferred that the non-solvent be as immiscible as possible therewith in order that a more complete separation and recovery of the resultant photochromic molding composition can be achieved. A series of precipitation steps may be conducted, if desired, in order to more completely separate the moldable compositions especially when the material used as a non-solvent is not completely immiscible. Examples of useful non-solvents include the straight chain hydrocarbons, such as n-butane, n-pentane, n-hexane, cyclohexane, methanol, ethanol and the like.

As mentioned above, the photochromic compositions produced by the novel process of the instant invention, contrary to those compositions of the prior art, may be molded into any desired shape or configuration, such as, for example, automobile windshields, eyeglass lenses, sky lights, window panes, jewelry, toys and the like. Any known molding technique may be used depending, of course, on the particular polymer which is to be molded, specific processes known for molding each type of polymer obviously being best suited therefor. A further modification of the process of the present invention comprises blending the moldable photochromic compositions with further amounts of the same or a different polymer used in the blending step. That is to say, if poly(methyl methacrylate) for example, were blended with a transition metal compound and a solvent and precipitated to produce a moldable, photochromic composition, said composition may then be further blended with additional poly(methyl methacrylate) or other polymer, e.g., poly(styrene) to produce a composition which is also moldable and photochromic. More particularly, the poly(methyl methacrylate) or poly(styrene) which is blended with the precipitated and recovered moldable composition may be added as a solution thereof in any of the above-mentioned solvents to produce a solution, which may be again precipitated by contacting it with further amounts of a non-solvent, to again produce a moldable photochromic composition. These modifications are generally utilized in order to alter or transform, if desired, the characteristics of the first moldable photochromic composition to be precipitated. For example, if the first moldable photochromic composition is transparent, a second polymer may be used which, when in combination with the first, will result in a second moldable photochromic composition which is translucent.

The exact phenomena which causes the compositions produced by the process claimed herein to be photochromic and moldable is not completely understood. It is known, however, that the compositions are not photochromic unless at least the thermoplastic resin or the solvent, or both, contain oxygen, in free or combined form. While we do not wish to be bound by any explanation of the photochromic mechanism which results or theory in regard thereto, it is possible that the active material may be formed by the formation of a metal adduct with the polymer. For example, utilizing poly(methyl methacrylate) and tungsten hexachloride, the photochromism could possibly result by formation of a tungsten addition product with a reactive oxygen in the polymer. The same result could also occur when the solvent present, if any, has a reactive oxygen therein. It is also known that the compositions produced are not moldable unless they are formed by precipitation rather than other, seemingly equivalent, means.

The scope of the present invention is also of such breadth so as to include the addition of such modifying materials as fillers, lubricants, plasticizers, stabilizers, antioxidants and the like as additives to the compositions produced by our novel process, before, after or during production thereof.

The compositions produced by our process may be used to produce such articles as memory devices such as optical analogue computers, temporary oscillographs, temporary photographic proofs, photographic marking devices, light switches, optical masks, wall panels, advertising articles and the like.

The following examples are set forth for purposes of illustration only and are not to be construed as limitations on the instant invention except as set forth in the appended claims. All parts and percentages are by weight unless otherwise specified.

*Example 1*

A film dope is prepared by blending 20 parts of poly(methyl methacrylate) with 80 parts of dioxane to produce a system containing 20% of the polymer and 80% of the solvent. 2.5 part of tungsten hexachloride are added to this solution and hydrochloric acid begins to evolve. The water-white solution passes through a series of color changes from straw to ink blue. After the acid evolution stops the solution is added to cyclohexane. A precipitate forms and is recovered by filtration on a Büchner funnel. The recovered material is dried and then molded into a disc one inch in diameter and one-sixteenth inch thick by heating in a die at 130° C., and a pressure of 500 p.s.i.

A colorless molded disc is recovered and is subjected to a light beam from a high pressure mercury lamp with a quartz envelope, after passing through an ultraviolet light band filter, to give a 0.1 milliamp reading on a selenium photocell. The band pass filter is then removed and the disc is irradiated for various time intervals and the changes in the near infrared, visible and ultraviolet spectra are followed on a spectrophotometer. A strong band in the near infrared, having a maximum at 1000 mµ, is bserved. The disc turns gradually to a deep blue in color nd reverts to its original colorless form in 2 hours after emoval from the light.

*Example 2*

The product of Example 1 is blended, before molding, vith an equivalent amount of molten poly(methyl methon the specific polymer utilized, exhibit a color change when subjected to ultraviolet light and revert to their original color when removed from said light. The results of the runs are set forth hereinbelow in Table I. Various examples are also presented which show that no photochromic effect is achieved if the process of the instant invention is not followed.

TABLE I

| Example | Polymer | Method of Ex. No. | Metal Compound | Percent [1] | Solvent | Non-solvent | P.C.M. |
|---|---|---|---|---|---|---|---|
| 1 | MMA/AN/ST terpolymer 6/20/20 | 2 | $WOCl_4$ | 50.0 | Methyl ethyl ketone | Heptane | Yes. |
| 2 | Poly(vinyl chloride) | 1 | $HfI_4$ | 1.0 | None | do | No. |
| 3 | Poly(styrene) | 1 | $TiCl_4$ | 3.0 | do | Cyclohexane | No. |
| 4 | do | 1 | $TiCl_4$ | 5.0 | Ethyl acetate | Heptane | Yes. |
| 5 | Poly(carbonate) [2] | 1 | $NbO_2Cl$ | 0.5 | Ethylene dichloride | Cyclohexane | Yes. |
| 6 | Poly(vinyl butyral) | 1 | $TaOI_3$ | 0.3 | Acetic acid | Heptane | Yes. |
| 7 | Cellulose triacetate | 1 | $WO_2F_2$ | 1.0 | Acetone | Cyclohexane | Yes. |
| 10 | Poly(acrylamide) | 1 | $TiO(OCH_3)_2$ | 0.1 | Ethylene glycol | Hexane | Yes. |
| 11 | Poly(acrylic acid) | 1 | $ZrCl_4$ | 0.5 | Methylethyl ketone | Methyl alcohol | Yes. |
| 13 | Polyurethane resin [3] | 1 | $Ta(O\overset{O}{\overset{\|}{C}}-C_6H_5)_5$ | 25.0 | Dimethyl formamide | Acetone | Yes. |
| 14 | Thermoplastic polyester resin [4] | 3 | $WI_2(O\overset{O}{\overset{\|}{C}}-C_{10}H_5)_4$ | 25.0 | Methyl ethyl ketone | Hexane | Yes. |
| 15 | Poly(styrene) | 1 | $HFI_3(OC_6H_5)$ | 0.1 | Benzene | Heptane | No. |
| 16 | Poly(ethylene) | 1 | $ZrBr_4$ | 0.1 | do | Ethyl alcohol | No. |
| 17 | MMA/MA copolymer 60/40 | 1 | $TiOCl_2$ | 0.5 | do | Cyclohexane | Yes. |
| 18 | Poly(vinyl acetate) | 1 | $NbF_5$ | 10.0 | Chloroform | do | Yes. |
| 19 | Thermoplastic polyester resin [4] | 1 | $WCl_5$ | 1.0 | Methyl ethyl ketone | n-Octane | Yes. |
| 20 | Poly(vinylidene chloride) | 1 | $HFOBr_2$ | 0.5 | None | Toluene | No. |
| 21 | Styrene/acrylonitrile copolymer (75/25). | 2 | $ZrBr_2(OC_2H_5)_2$ | 0.5 | Benzene | Heptane | No. |
| 22 | Poly(vinyl chloride) | 2 | $VO_2Br$ | 5.0 | Dioxane | Iso-octane | Yes. |
| 23 | Poly(acetaldehyde) | 1 | $TiOF_2$ | 0.4 | Acetone | Toluene | Yes. |
| 24 | Poly(methyl acrylate) | 1 | $WBr_6$ | 0.5 | Dioxane | Methyl alcohol | Yes. |
| 25 | Poly(ethyl methacrylate) | 1 | $HfOF_2$ | 0.1 | Ethylene dichloride | Hexane | Yes. |
| 26 | Poly(methyl methacrylate) | 1 | $NbOI_3$ | 1.0 | None | Heptane | Yes. |
| 27 | Poly(styrene) | 3 | $VOCl_3$ | 3.0 | Ethyl acetate | Methyl alcohol | Yes. |
| 28 | Poly(acrylonitrile) | 1 | $CrO^2Cl_2$ | 15.0 | Dimethyl formamide | Benzene | Yes. |
| 29 | Poly(ethyl acrylate) | 2 | $VO(OC_4H_9)_3$ | 4.0 | Ethylene dichloride | Methyl alcohol | Yes. |
| 30 | Polyamide resin [5] | 1 | $Ti(OCH_3)_4$ | 3.0 | Benzyl alcohol | Isopropyl alcohol | Yes. |
| 31 | Poly(vinyl acetate) | 3 | $WO_2(OC_{12}H_{25})_2$ | 0.5 | None | Cyclohexane | Yes. |
| 32 | Poly(vinyl chloride) | 1 | $HfI_4$ | 0.5 | Dioxane | Hexane | Yes. |
| 33 | Poly(butyl methacrylate) | 1 | $ZrOI_2$ | 0.1 | Gamma-valerolactone | Ethyl alcohol | Yes. |
| 34 | Poly(methyl methacrylate) | 1 | $TiF_2(OC_{10}H^6)_2$ | 10.0 | None | do | Yes. |
| 35 | Poly(vinyl alcohol) | 1 | $WO_2Cl_2$ | 2.0 | Ethylene glycol | Benzene | Yes. |
| 36 | Poly(oxymethylene) | 1 | $TaCl_5$ | 4.0 | None | Xylene | Yes. |
| 37 | Cellulose acetate butyrate | 1 | $TaO_2Br$ | 1.0 | Acetone | Heptane | Yes. |

[1] Percent, by weight, of metal compound based on polymer.
[2] Commercially available carbonate resin produced by reacting phosgene with bisphenol A to give a product having the structure:

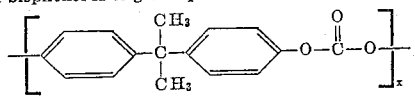

[3] Commercially available polyurethane resin produced by reacting a polyester resin of diethylene glycol, hexanediol-1,3 and phthalic acid with 2,4-toluenediisocyanate.
[4] Commercially available polyester resin produced from 50% phthalic acid, 25% diethylene glycol and 25% dipropylene glycol.
[5] Commercially available polyamide resin produced from hexamethylene diamine and adipic acid.
MMA = Methyl methacrylate.
MA = Methyl acrylate.
AN = Acrylonitrile.
ST = Styrene.
P.C.M. = Photochromic and moldable.

acrylate), and is then molded as in Example 1. The molded disc is colorless and turns deep blue when subjected to ultraviolet light of 300–400 mµ wavelength. The molded disc returns to a colorless state one hour after removal from the ultraviolet light source.

*Example 3*

The product of Example 1 is blended, before molding, with a solvent solution of poly(methyl methacrylate) in dioxane (70% solids), filtered, and precipitated into cyclohexane. The precipitate is recovered by filtration and the resultant polymer is dried and molded as in Example 1. The molded disc is clear and colorless and turns blue when contacted with the rays of the sun. The blue color fades in one hour when the disc is placed in the dark.

Following the procedures of Examples 1–3 above, various other polymers, solvents and transition metal compounds are treated according to the instant invention. Moldings produced from the resulting polymeric compositions, the specific molding conditions being dependent

We claim:
1. A method for the production of a moldable photochromic composition of matter which comprises intimately blending a polymer, a solvent therefor and a metal compound having the formula

wherein M is a metal selected from the group consisting of titanium, zirconium, tungsten, hafnium, tantalum, chromium, vanadium and niobium, X is a halide, R is selected from the group consisting of an alkyl radical having from 1–12 carbon atoms, inclusive, an aryl radical having from 6–10 carbon atoms, inclusive, and an

radical, $R^1$ is selected from the group consisting of an alkyl radical having from 1–12 carbon atoms, inclusive, and an aryl radical having 6–10 carbon atoms, inclusive, $m$ and $p$ are whole, positive integers of from 0–6, inclusive and $n$ is a whole, positive integer from 0–2, inclusive, the total of $2n+m+p$ being equal to the valence of the metal M, at least one of $m$ and $p$ being an integer of at least 1, at least one of said polymer and said solvent containing oxygen, to form a homogeneous blend, precipitating said homogeneous blend into a non-solvent for said plymer and said transition metal compound and recovering the resultant precipitated moldable photochromic composition of matter.

2. A process according to claim 1, wherein said polymer is poly(methyl methacrylate).

3. A process according to claim 1, wherein said metal compound is tungsten hexachloride.

4. A process according to claim 1, wherein said solvent is dioxane.

5. A process according to claim 1, wherein said polymer is poly(methyl methacrylate), said metal compound is tungsten hexachloride and said solvent is dioxane.

6. A process according to claim 1, wherein said polymer is poly(methyl methacrylate), said metal compound is niobium pentachloride and said solvent is ethyl acetate.

7. A method for the production of a moldable photochromic composition of matter which comprises intimately blending an oxygen-containing polymer and a metal compound having the formula $$MX_mO_n(OR)_p$$

wherein M is a metal selected from the group consisting of titanium, zirconium, tungsten, hafnium, tantalum, chromium, vanadium and niobium, X is a halide, R is selected from the group consisting of an alkyl radical having from 1–12 carbon atoms, inclusive, an aryl radical having from 6–10 carbon atoms, inclusive, and an

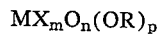

radical, $R^1$ is selected from the group consisting of an alkyl radical having from 1–12 carbon atoms, inclusive, and an aryl radical having 6–10 carbon atoms, inclusive, $m$ and $p$ are whole, positive integers of from 0–6, inclusive and $n$ is a whole, positive integer from 0–2, inclusive, the total of $2n+m+p$ being equal to the valence of the metal M, at least one of $m$ and $p$ being an integer of at least 1, to form a homogeneous blend, precipitating said homogeneous blend into a non-solvent for said polymer and said transition metal compound and recovering the resultant precipitated moldable photochromic composition of matter.

8. A process according to claim 1 wherein said polymer is poly(methyl methacrylate).

9. A process according to claim 1, wherein said metal compound is tungsten hexachloride.

References Cited

Brown, G. H.: Phototropy, a Literature Review, December 1959, AD #234, 009, pp. 18–20.

El-Sayed: "New Class of Photochromic Substances: Carbonyls," J. Phys. Chem., 68, 433–4 (1964).

Singh, G.: "Phototropy of Inorganic Salts," J. Chem. Soc. 121, 782–5 (1962).

J. TRAVIS BROWN, *Acting Primary Examiner.*

NORMAN G. TORCHEN, *Examiner.*

C. E. DAVIS, *Assistant Examiner.*